Oct. 21, 1969  R. K. McKIBBEN ET AL  3,473,660
TENSIONING MEANS FOR CIRCULAR SEPARATOR SCREENS
Original Filed Sept. 22, 1965  2 Sheets-Sheet 1

RICHARD K. McKIBBEN
FLOYD A. LUNDY
INVENTORS

BY Lyon+Lyon
ATTORNEYS

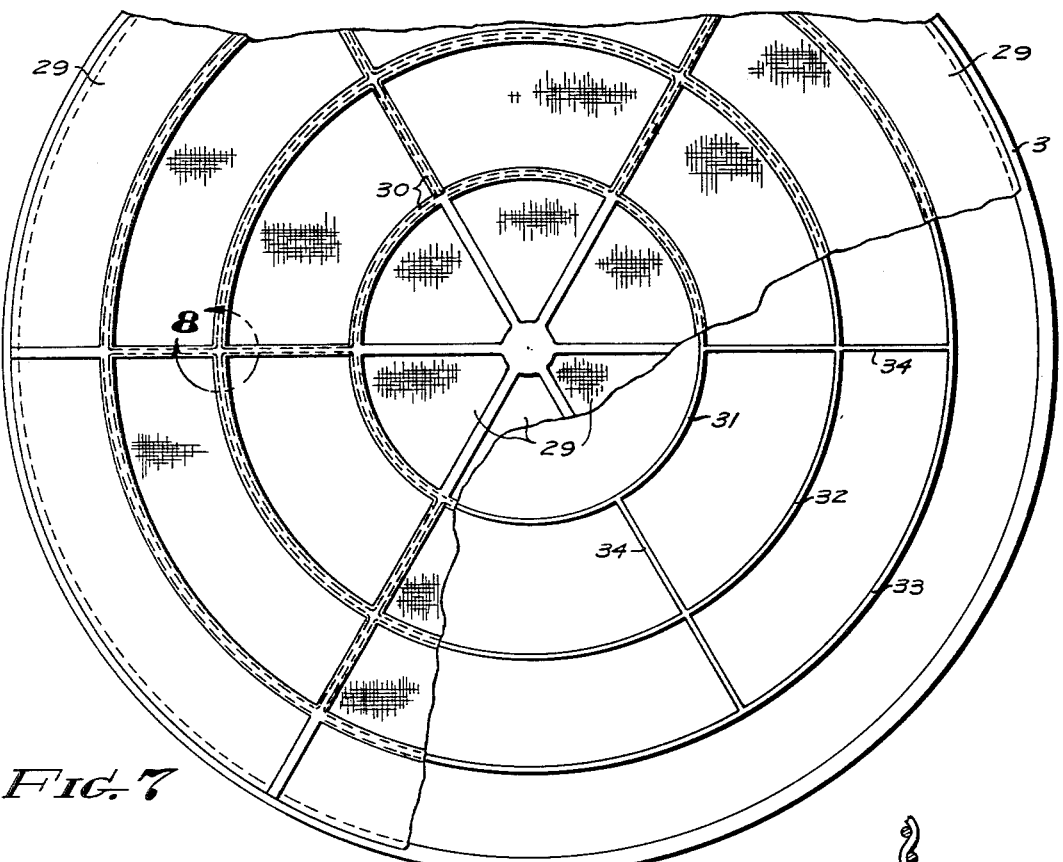
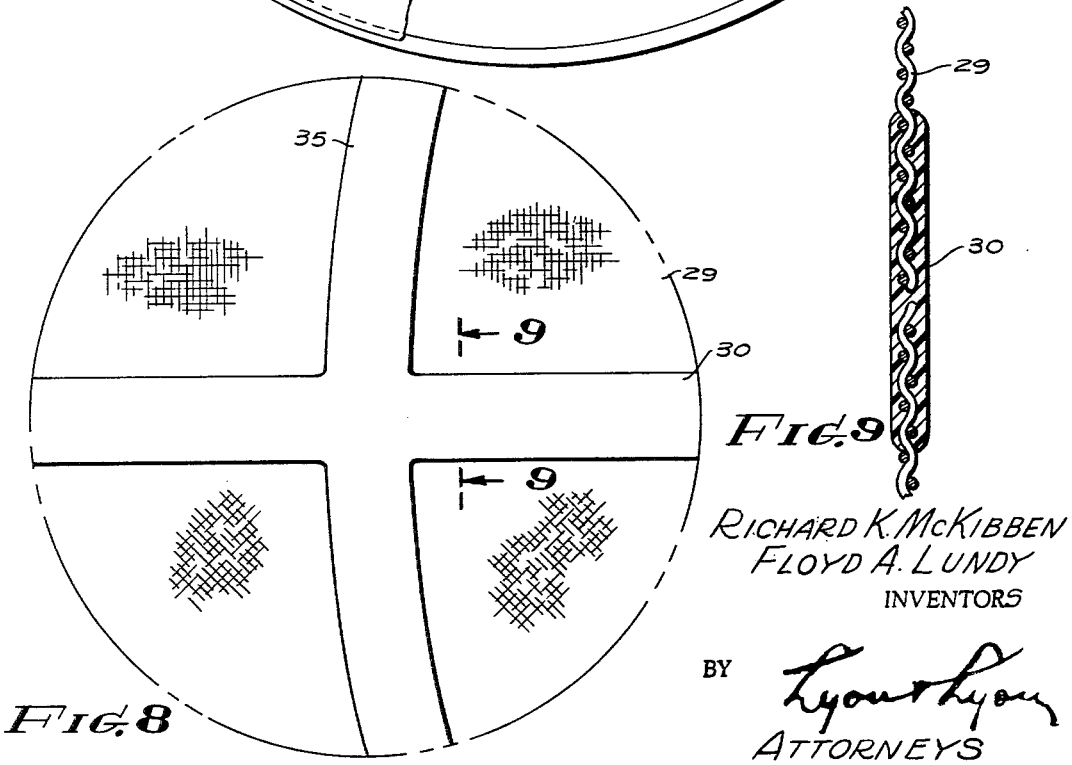

United States Patent Office

3,473,660
Patented Oct. 21, 1969

3,473,660
TENSIONING MEANS FOR CIRCULAR SEPARATOR SCREENS
Richard K. McKibben, La Canada, and Floyd A. Lundy, Gardena, Calif., assignors to SWECO, Inc., a corporation of California
Continuation of application Ser. No. 489,202, Sept. 22, 1965. This application Apr. 18, 1968, Ser. No. 722,495
Int. Cl. B07b *1/04, 1/00*
U.S. Cl. 209—403     5 Claims

ABSTRACT OF THE DISCLOSURE

A vibratory separator having a screen and means for tensioning the screen. An annular member is provided between the screen and a support member, the annular member engaging the screen. Adjustable means are provided between the annular member and the support member for effecting relative axial displacement of the annular member and support member for enabling tensioning of the screen. A cushioning member may be provided on the annular member, and the screen may include a reinforcing band secured thereto and overlying the annular member. The annular member may be in the form of a hub having spokes extending radially from the hub and joined with a rim. The screen may be divided into sections with reinforcing means coupling together the sections.

---

This application is a continuation of U.S. patent application Ser. No. 489,202, now abandoned filed Sept. 22, 1965, for Tensioning Means for Circular Separator Screens.

First, to provide a tensioning means in which one or more annular rings press upwardly against a circular screen of a vibratory separator for the purpose of tensioning the screen as well as improving the transfer of vibrations to the screen and thereby increasing the efficiency of the screen.

Second, to provide a screen and tensioning means therefor wherein plastic material having elastomeric properties fills the interstices of the screen in the regions engaged by the tensioning means to reinforce the screen without producing lines of stress concentration.

Third, to provide a tensioning means for separator screens wherein the tensioning means including an annular screen tensioning member may be supported from a central post and wherein the tensioning means may include leaf springs in the form of spokes to permit yieldable contact between the screen and the annular tensioning member.

Fourth, to provide a separator screen and tensioning means therefor, which permits the construction of circular separators of substantially greater area than has been heretofor feasible; more particularly, to provide an arrangement wherein the screen may comprise several sections joined by radially extending plastic reinforcing means fused in the marginal interstices of the screen sections and joining the sections together.

With the above and other objects in view as may appear hereinafter, reference is directed to the accompanying drawings, in which:

FIGURE 7 is a fragmentary plan view showing a further modified form of the tensioning means as well as a modified form of the separator screen.

FIGURE 8 is an enlarged plan view taken within circle 8 of FIGURE 7.

FIGURE 9 is an enlarged fragmentary sectional view taken through 9—9 of FIGURE 8.

The type of separator for which the present invention is adapted is disclosed in the following Miller et al. Patents: 2,696,302; 2,714,961; 2,753,999 and 2,777,578 as well as in the Wright, Jr., et al. Patent, 3,029,946 and the McCausland Patent 3,035,700.

These patents illustrate a separator which is mounted on a ring of springs and includes a motor provided with eccentric weights which, on rotation, vibrate the separator. The separator also includes a stack of cylinders, between which is clamped one or more separator screens and means are provided for discharge of undersize or oversize particles.

Figure 1:
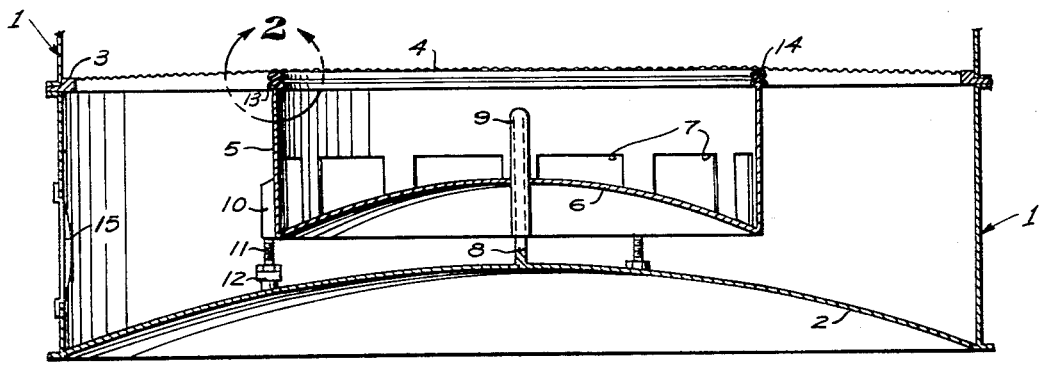
FIGURE 1 is a transverse sectional view of a separator screen and the tensioning means therefor shown in conjunction with a unit of a circular separator.

With reference to FIGURE 1 of the drawings, a unit of the separator includes a cylindrical shell 1 having a dome-shaped discharge pan 2 secured by its margins to the lower extremity of the shell. A discharge opening, not shown, is provided.

An upper extremity of the shell supports a screen frame 3 in the form of a ring to which the margins of a screen 4 are secured. The mesh of the screen may vary from extremely fine mesh to relatively coarse mesh, depending upon the material to be separated. For purposes of illustration, the diameter of the wires comprising the screen is exaggerated.

Figure 2:
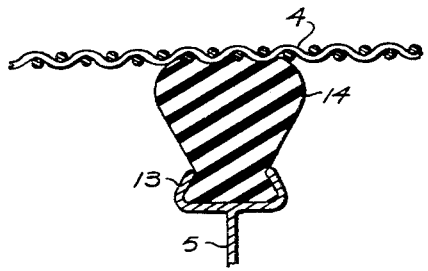
FIGURE 2 is an enlarged fragmentary sectional view taken within circle 2 of FIGURE 1.

The tensioning means shown in FIGURES 1 and 2 comprises a cylindrical shell 5 which may be approximately one-half the diameter of the outer shell 1 of the separator but may be smaller or larger as desired. Secured to the lower end of the shell 5 is a pan 6, preferably dome-shaped in the manner of the discharge pan 2. The lower portion of the shell 5 is provided with a series of discharge apertures 7 so that material falling on the pan 5 readily discharges therefrom onto the pan 2.

The discharge pan 2 is provided with an upwardly extending centrally disposed guide post 8, which slidably receives a guide tube 9 secured in the pan 6.

The shell 5 is provided with several, preferably three, bosses 10 which are internally screwthreaded and receive bolts 11 provided at their lower ends with pads 12 which bear against the pan 2.

At the upper extremity of the shell 5, there is provided an annular clamp rim 13 in which is secured a cushion ring 14.

Operation of the tensioning means as shown in FIGURES 1 and 2 is as follows:

The tension device is positioned on the guide post 8 with the bolts 11 initially adjusted so that the cushion ring 14 clears the screen 4. After the screen is secured between adjacent shells, the bolts 11 are adjusted to urge the cushion ring 14 upwardly against the screen 4 until the screen is properly tensioned. Access to the bolts 11 may be had through suitable hand holes 15.

The portion of the screen within the cushion ring 14 is mounted in a flat condition, whereas that portion of the screen between the cushion ring 14 and the screen frame 3 is slightly conical.

It should be observed that when the separator is vibrated, the vibrations are transmitted to the screen not only through the screen frame 3, but also through the tensioning means. This is due to the fact that the tensioning means bears through the discharge pan 2 as well as against the screen 4. In previous practice, transmission of vibrations to the screen was accomplished by the screen frame 3 and a cylindrical tie-down bolt with the result that separator screens of large diameter tended to whip in the region between their centers and their outer peripheries. By utilizing the annular tensioning means afforded by the cushion ring 14, this whipping condition is minimized.

Figure 3:
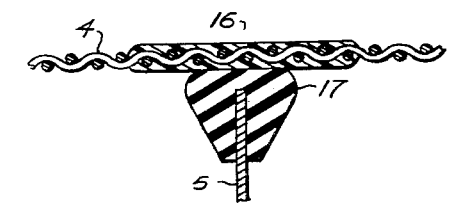
FIGURE 3 is a similar enlarged fragmentary sectional view showing a modified construction.

It is desirable that the cushion ring 14 be relatively soft and bear against a relatively wide annular section of the screen so as to avoid stress concentration, which would result in undue wear of the screen. Excessive wear may also be minimized by the provision of annular reinforcing bands 16, as illustrated in FIGURE 3. The reinforcing bands are formed of polyurethane or silicone rubber, preferably of the room temperature vulcanizing type, however, other elastomers may be utilized. The reinforcing is so applied as to fill the interstices of the screen and its upper surface is preferably, essentially flush with at least the upper surface of the screen.

By use of the reinforcing bands 16, the cushion ring 14 may be merely a bearing ring 17 having only nominal cushion properties.

Figure 4:
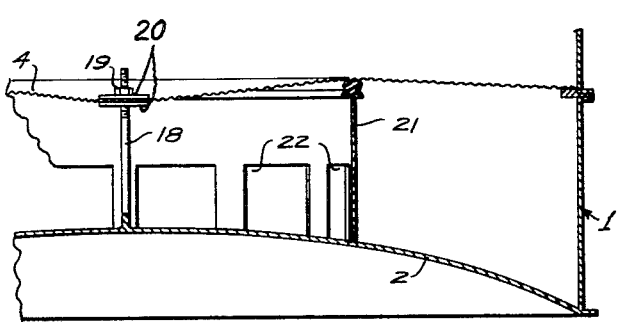
FIGURE 4 is a fragmentary view similar to FIGURE 1, showing a further modified construction.

Reference is now directed to FIGURE 4. It is sometimes desirable to adapt the tensioning means to screens which have been previously provided with a center tie-down. Such conventional center tie-downs comprise a central rod 18 secured to the discharge pan 2 and screw-threaded at its upper end to receive a nut 19. The screen itself is provided with reinforcing washers welded or otherwise secured to the screen; and in addition, one or more clamp washers 20 are provided which fit the rod 18. By screwing downward on the nut 19, the screen is tensioned.

By reason of the adjustment afforded by the conventional center tie-down, a fixed shell 21 may be substituted for the cylindrical shell 5; that is, the shell 21 may be secured directly to the discharge pan 2, but is, of course, provided with slots or other apertures 22 for radially outward movement of material.

When the fixed shell 21 is in place, tensioning of the screen is accomplished by the central rod 18 and the tensioning nut 19. The outer periphery of the screen may slope upwardly slightly or downwardly slightly and the central portion within the shell 21 may slope downwardly at an increased angle.

Figure 5:
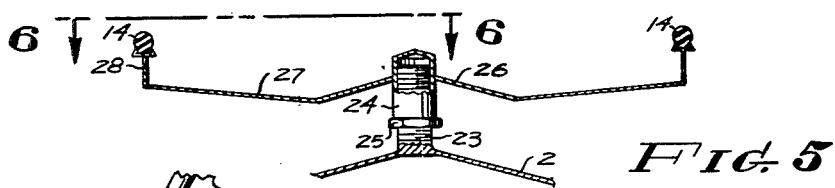
FIGURE 5 is a transverse sectional view of a further modified form of tensioning means with the screen omitted and showing fragmentarily an adjacent portion of the separator pan.
Figure 6:
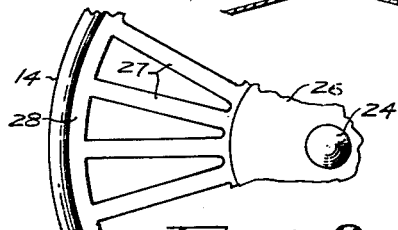
FIGURE 6 is a fragmentary plan view taken from 6—6 of FIGURE 5.

Reference is now directed to FIGURES 5 and 6. In this construction a screw-threaded central post 23 is secured to the discharge pan 2. The central post slidably receives a cap 24 which is upwardly adjustable by means of a nut 25. A hub 26 extends radially from the cap 24 and flexible spokes 27 extend radially from the hub 26 and are joined to a rim 28 corresponding to the clamp rim 13 and provided with a cushion ring 14. As in the first described structure, the cushion ring 14 bears against the screen so that the screen is tensioned. The flexible spokes 27 provide therebetween apertures for the discharge of material and also serve to equalize the contact pressure between the cushion ring 14 and the screen.

Reference is now directed to FIGURES 7, 8 and 9. The tensioning means thus far described involves a single ring which bears against the separator screen. In some instances, however, it is desirable to use two or more tension rings. This is particularly so in the case of separators of large diameter. A limiting factor in the construction of circular separators is the fact that the wire cloth from which the screens are fabricated is limited in width, a standard maximum width being about four feet.

The tension means may be adapted to serve not only as a means for tensioning these screens, but also for supporting a screen comprising several pie-shaped sections, thus permitting the construction of separators of materially larger diameter than has heretofore been feasible. More particularly, as illustrated in FIGURES 7, 8 and 9, the separator screen may comprise several screen sections 29 disposed in abutting or overlapping relation and joined by radial reinforcing bands 30 and formed of polyurethane or a silicone rubber or other elastomeric materials having the requisite tensile strength.

As shown in FIGURE 9, the bands 30 fill the interstices of the screen sections and extend a minimal distance beyond the surfaces of the screens. In order to tension a large composite screen of this type, three concentric supporting rings 31, 32 and 33 are illustrated. The rings are joined by radially extending supporting ribs 34 which underlie the radial bands 30. The composite screen is also provided with circular bands 35 which overlie the supporting rings 31, 32 and 33. The supporting rings may be individually adjustable vertically; however, preferably, the supporting rings and the radial rings are mounted on a common frame similar to the construction shown in FIGURE 1. In this case, the upper surfaces of the rings 31, 32 and 33 may be at the same level, in which case, the principal tensioning ring is the outer ring 33. It is also feasible to position the rings at gradually increasing height so that each ring performs its share of the tensioning function.

What is claimed is:
1. A vibratory separator including a screen and tensioning means therefor comprising:
   a housing,
   a circular screen attached to said housing, said screen being substantially planar over the effective screening thereof,
   a discharge pan underlying said screen and coupled to said housing,
   means for tensioning said screen, said means including an annular member positioned between said screen and said discharge pan and being unattached with respect to said screen, said annular member engaging said screen and dividing the screen into a central circular screening portion and an annular outer screening portion through which material to be separated may pass, and including an adjustable member coupled with said annular member and said discharge pan for effecting relative axial displacement of said annular member and said discharge pan for enabling tensioning of said screen, said annular member including a hub coupled with said adjustable member and spokes extending radially from said hub and joined with a rim, said rim engaging said screen, and
   vibratory means coupled with said housing for vibrating said housing and said screen.
2. A separator as in claim 1 wherein:
   said screen includes a reinforcing band secured thereto and overlying said annular member.
3. A vibratory separator including a screen and tensioning means therefor comprising:
   a housing,
   a circular screen attached to said housing, said screen being substantially planar over the effective screening thereof,
   a discharge pan underlying said screen and coupled to said housing,
   means for tensioning said screen, said means including an annular member positioned between said screen and said discharge pan and being unattached with respect to said screen, said annular member engaging said screen and dividing the screen into a central circular screening portion and an annular outer screening portion through which material to be separated may pass, and including an adjustable member coupled with said annular member and said discharge pan for effecting relative axial displacement of said annular member and said discharge pan for enabling tensioning of said screen, said means for tensioning said screen includes a plurality of annular members, said annular members being disposed in a concentric relationship, and vibratory means coupled with said housing for vibrating said housing and said screen.

4. A separator as in claim 3 including:
screen supporting means extending radially between said concentric annular members.

5. A separator as in claim 4 wherein:
said screen is divided into sections along the radii defined by said radially extending screen supporting means, and said screen is provided with reinforcing bands overlying said radially extending screen support means, said reinforcing means connecting together said screen sections and substantially filling the interstices of said screen along the adjoining areas of said screen sections.

References Cited

UNITED STATES PATENTS

| | | | |
|---|---|---|---|
| 156,457 | 11/1874 | Esselstyn | 209—405 |
| 373,382 | 11/1887 | Truesdale | 209—275 |
| 1,087,994 | 2/1919 | Sturtevant | 209—403 |
| 1,284,095 | 11/1918 | Gruenuer | 209—271 X |
| 3,035,700 | 5/1962 | McCausland | 209—332 X |
| 3,158,568 | 11/1964 | Holman | 209—332 X |

HARRY B. THORNTON, Primary Examiner

R. HALPER, Assistant Examiner

U.S. Cl. X.R.

209—332